United States Patent
Peter et al.

(10) Patent No.: US 6,828,361 B2
(45) Date of Patent: Dec. 7, 2004

(54) METHOD FOR MAKING A RUBBER BASE COMPOSITION CONTAINING SILICIC ACID

(75) Inventors: Julius Peter, Dommayergasse 7/13, 1130 Vienna (AT); Winfried Heidrich, Lauenau (DE); Dirk Gross, Hannover (DE); Heinrich Sandau, Burgdorf (DE)

(73) Assignees: Continental Aktiengesellschaft, Hannover (DE); Julius Peter, Vienna (AT)

(*) Notice: Subject to any disclaimer, the term of this patent is extended or adjusted under 35 U.S.C. 154(b) by 282 days.

(21) Appl. No.: 10/006,714

(22) Filed: Dec. 10, 2001

(65) Prior Publication Data

US 2002/0123555 A1 Sep. 5, 2002

(30) Foreign Application Priority Data

Dec. 8, 2000 (DE) .......................... 100 61 473

(51) Int. Cl.[7] .............. C08J 3/22; C08J 3/215; C08K 3/36; C08L 21/00
(52) U.S. Cl. ............ 523/348; 523/212; 523/344; 523/351; 523/353; 524/492
(58) Field of Search ................ 523/348, 351, 523/353, 344, 212; 524/492

(56) References Cited

U.S. PATENT DOCUMENTS 4,910,237 A    3/1990  Peter
5,354,612 A *  10/1994 Miyabayashi ............ 428/331
5,496,107 A    3/1996  Peter
2002/0019473 A1 * 2/2002 Kayser et al. ............ 524/442

FOREIGN PATENT DOCUMENTS

| DE | 43 14 706 | 10/1994 |
| EP | 0 728 803 | 8/1996 |
| EP | 0 837 095 | 4/1998 |
| JP | 59 024646 | 2/1984 |

* cited by examiner

Primary Examiner—Tae H. Yoon
(74) Attorney, Agent, or Firm—Walter Ottesen

(57) ABSTRACT

A method for making a silicic acid containing rubber base composition includes providing composition ingredients of rubber, silicic acid, silane and additional additives except for vulcanization ingredients. First and second mixers separate from each other are provided wherein the ingredients except for the vulcanization ingredients can be mixed. All of the composition ingredients are introduced into the first mixer except for the vulcanization ingredients simultaneously or at time intervals. The composition ingredients introduced into the first mixer are mixed to a composition. The composition formed in the first mixer is transferred directly into the second mixer without an intermediate storage thereof. The transferred composition formed in the first mixer is mixed at least almost to completion in the second mixer with the temperature lying in the temperature range of 130° C. to 180° C. at least over the greatest part of the dwell time of the composition in the second mixer wherein the silicic acid reacts acceleratedly with the silane.

12 Claims, 3 Drawing Sheets

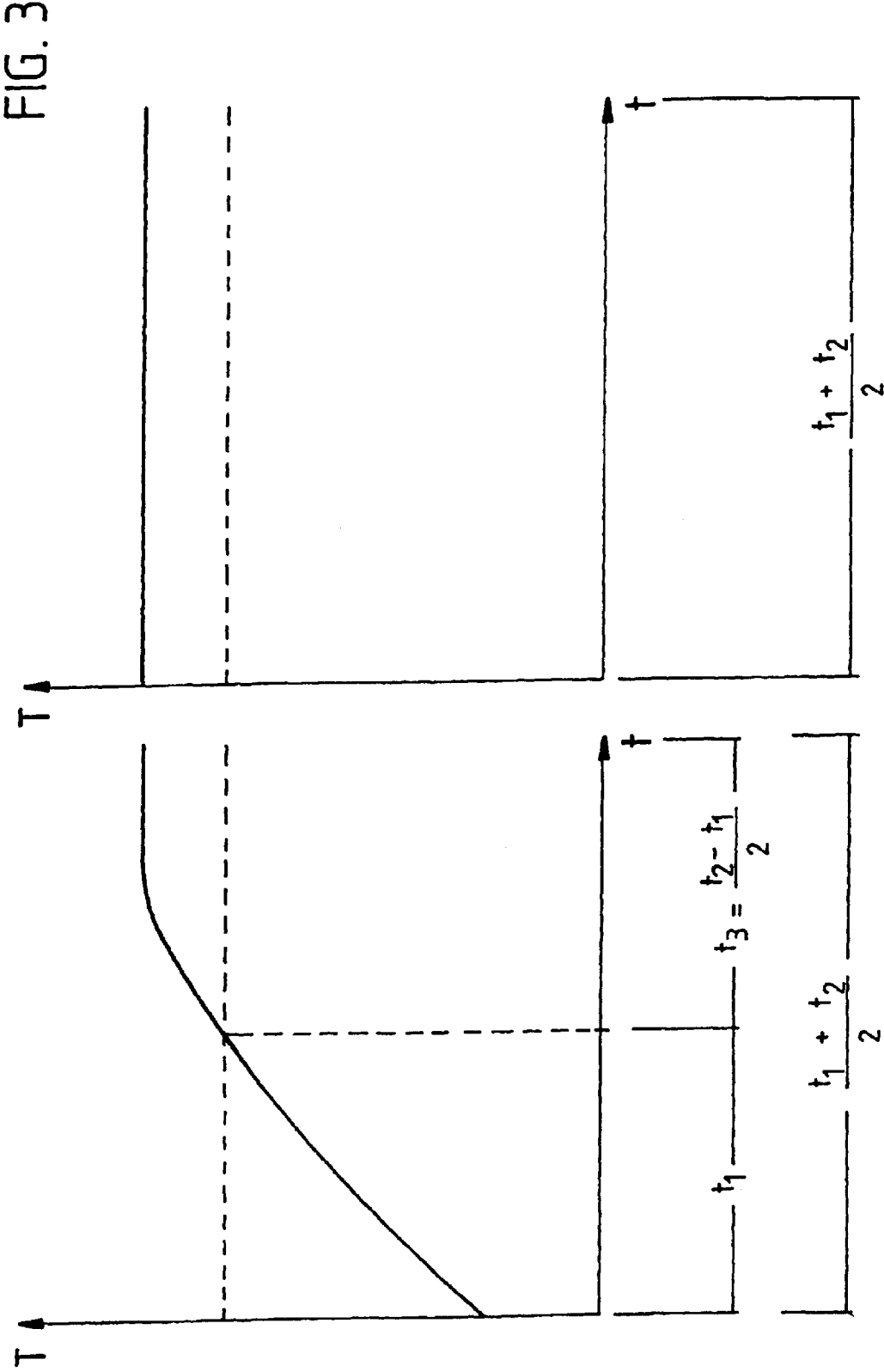

METHOD FOR MAKING A RUBBER BASE COMPOSITION CONTAINING SILICIC ACID

FIELD OF THE INVENTION

The invention relates to a method for making a rubber base composition containing silicic acid. This method is carried out in two stages in separate mixers and the composition ingredients silicic acid, silane and other usual additives except vulcanization ingredients are mixed and the silicic acid reacts with the silane.

BACKGROUND OF THE INVENTION

Rubber compositions containing silicic acid are used today for making the most varied rubber products, especially, for making tires for motor vehicles. In motor vehicle tires, the silicic acid replaces for the most part the earlier conventional carbon black constituents. This is so because it has been shown that motor vehicle tires acquire improved tire characteristics with respect to wet resistance and rolling resistance because of the addition of silicic acid. For producing the rubber composition, a silicic-acid containing rubber base composition is produced first in a base mixing process in one or several mixing stages. This rubber base composition does not yet contain vulcanization ingredients (vulcanization chemicals such as sulfur, sulfur donors, accelerators or resins). In a final mixing process, the vulcanization ingredients (vulcanization chemicals) are added to the rubber base composition and the finished rubber composition (final composition) results.

In the production of the rubber base composition, coupling agents in the form of silanes are added to the rubber base composition in addition to the silicic acid in order to make possible a binding of the silicic acid to the rubber. The silanes are, inter alia, bifunctional organic silanes such as 3-mercaptopropyl triethoxy silane, 3-thiocyanato-propyl trimethoxy silane or 3,3'-bis(triethoxy silylpropyl)polysulfide with 2 to 8 sulfur atoms. In a first step, and during the base mixing, the added silane reacts with the silanol groups of the silicic acid and, in a second later step, during the vulcanization of the rubber composition, the silane reacts with the rubber, whereby the silicic acid is bonded to the rubber via the silane. The first reaction step and therefore the manufacture of the rubber base composition is very time intensive.

U.S. Pat. No. 5,804,636 discloses a method for making a silicic-acid containing rubber base composition of the kind mentioned initially herein. In a first stage of the method, the composition ingredients of rubber, silicic acid and additional additives except the vulcanization ingredients are mixed with each other at a temperature in the range of 165° C. to 170° C. in a first mixer. After mixing the composition ingredients, the composition is removed from the first mixer, cooled and transferred to a second mixer. In the second mixer, silane is added to the composition and the composition is mixed to completion at a temperature of 135° C. and the silane reacts with the silicic acid. Because of the high temperature of the composition in the first mixer, it is ensured that the composition ingredients disperse rapidly and well; whereas, a thermal decomposition of the silane is avoided by maintaining the temperature of 135° C. in the second mixer. Furthermore, by using two mixers, the advantage is provided that, at the same time, a rubber base composition without silane is mixed in the first mixer and, in the second mixer, a rubber base composition with silane can be mixed to the end. In this way, the expenditure of time for producing a rubber base composition containing silicic acid is shortened.

It is, however, noted that in the method set forth in U.S. Pat. No. 5,894,636, the silicic-acid containing rubber base composition must be cooled down in an intermediate step which leads to an additional expenditure of time and storage.

SUMMARY OF THE INVENTION

It is an object of the invention to provide a simple method for producing a silicic-acid containing rubber base composition which can be executed with a reduced expenditure of time.

The method of the invention is for making a silicic acid containing rubber base composition. The method includes the steps of: providing composition ingredients of rubber, silicic acid, silane and additional additives except for vulcanization ingredients; providing first and second mixers separate from each other wherein the ingredients except for the vulcanization ingredients can be mixed; introducing all of the composition ingredients into the first mixer except for the vulcanization ingredients simultaneously or at time intervals; mixing the composition ingredients introduced into the first mixer to a composition in the first mixer; transferring the composition formed in the first mixer directly into the second mixer without an intermediate storage thereof; and, mixing the transferred composition formed in the first mixer at least almost to completion in the second mixer with the temperature lying in the temperature range of 130° C. to 180° C. at least over the greatest part of the dwell time of the composition in the second mixer wherein the silicic acid reacts acceleratedly with the silane.

In the first and second mixer, a rubber base composition is therefore produced and, in the second mixer, the silane reacts almost completely with the silanol groups of the silicic acid (that is, the rubber base composition is then at least mixed almost to the end). At further processing stations, the rubber base composition is processed further and, in the last processing station, the vulcanization ingredients (vulcanization chemicals) are added to the rubber base composition and the rubber base composition is there mixed to completion in a final mixing process.

In the first mixer, the usual composition ingredients are dispersed in the rubber (or in the rubbers). Here, the temperature of the composition is increased up to a maximum of 180° C. in order to substantially prevent a scorching of the composition. It is possible that the composition temperature lies below 130° C. in advance of transferring the composition from the first mixer into the second mixer. In this case, the composition temperature is increased to a temperature in the temperature range of between 130° C. and 180° C. in the second mixer before the composition is mixed to the end in the second mixer. To adjust the temperatures in the mixers, the fill level of the mixture, the rpm of the rotors of the mixers, the mixer temperature control and the plunger pressure of the mixers (insofar that the corresponding mixer includes a plunger) are matched to each other.

An advantage of the invention is especially that the method can be executed with a reduced expenditure as to both time and space because an intermediate storage and cooling of the rubber base composition after separating the same from the first mixer is unnecessary. A further advantage of the invention is that all composition ingredients of the rubber base composition are introduced into the first mixer and therefore also only stationary metering devices are needed in the region of the first mixer. Furthermore, it is ensured that the individual composition ingredients in the rubber base composition are present in the correct amounts. (At this point, it is noted that in the method known from U.S. Pat. No. 5,804,636, the above is not ensured. Accordingly, it can happen that, when separating the rubber base composition from the first mixer, composition ingredients remain in the first mixer so that the rubber base mixture in the second mixer is supplied with too much silane; on the other hand, it can be that residual amounts from previous mixture operations are separated from the first mixer with the rubber base composition so that the rubber base composition is supplied with too little silane in the second mixer.)

Compared to a method for producing a rubber base composition wherein only a single mixer is used, the invention affords the advantage that the first and the second mixers can be operated simultaneously so that the clock time is shortened in which a rubber base composition is mixed to the end. A shortening of the clock time can also be achieved in that one sets up two individual mixers wherein a rubber base composition is formed in each of the mixers independently of each other. However, this would require much space and furthermore a metering device would be needed for each mixer or a movable metering device would be needed which can serve both mixers, which is complex and expensive.

According to another feature of the invention, the composition is heated in the first mixer to a temperature which lies in the temperature range of 110° C. to 140° C. The advantage of this embodiment is that, in the first mixer, already a high temperature is achieved and therefore a good dispersion of the composition ingredients is ensured. Furthermore, in this case, only a slight increase in temperature or no temperature increase need take place in the second mixer.

According to another feature of the invention, the composition is heated to a temperature in the first mixer which lies in a temperature range of 130° C. to 180° C. The advantage of this embodiment is that an accelerated reaction of the silicic acid with the silane takes place already in the first mixer. Furthermore, in this case, no further temperature increase of the composition is needed in the second mixer. A further advantage of this embodiment is that dwell times for the composition in the individual mixers can be matched optimally to each other.

According to another embodiment of the invention, the dwell time of the composition in the first mixer corresponds at least approximately to the dwell time of the composition in the second mixer. The advantage of this embodiment is that the two mixers can always be used simultaneously and can therefore be matched to each other so that a transfer of the composition from the first mixer into the second mixer and a discharge of a rubber base composition, which is mixed in the second mixer almost to the end, can take place simultaneously or only shortly one behind the other. In this way, an optimal usage of the capacity of the two mixers and the production of a rubber base composition in an optimal clock time is possible. This clock time corresponds to the dwell time of the composition in a mixer.

Another embodiment of the method of the invention includes the steps of: a first time duration is needed in order to uniformly distribute the composition ingredients; a second time duration longer than the first time duration is needed in order to bring about at least almost a complete reaction of the silicic acid with the silane; the dwell time in the first mixer and the dwell time in the second mixer corresponds to half of the total time composed of the first and second time durations; and, the temperature of the composition in the first mixer is held in a temperature range of 130° C. to 180° C. over at least a time span which amounts to the difference between the second time duration and the dwell time of the composition in the second mixer.

The advantage of this embodiment is that the dwell time of the composition in the mixers also matches when the reaction of the silicic acid with the silane takes a longer time duration than the dispersion of the composition ingredients to a composition (which is especially often the case for the rubber base compositions for producing motor vehicle tires).

According to another feature of the invention, the first mixer is a ram type mixer. The advantage of this embodiment is that a high pressure can be built up in the first mixer with the aid of the ram so that excellent dispersion of the composition ingredients is ensured even at the relatively low temperatures in the first mixer.

According to another embodiment of the invention, the rotors of the first mixer mutually engage. The advantage of this embodiment is that an improved and more rapid dispersion of the composition ingredients is possible than for a mixer without interengaging rotors because the ratio of the surface of the rotors to the fill volume of the mixer is improved. The more rapid thorough mixing of the composition ingredients in the first mixer leads to shortened mixture times for the rubber base composition.

According to still another embodiment of the invention, the second mixer is a ramless mixer. The advantage of this embodiment is that ramless mixers are open and, for this reason, a simple transfer is possible of the rubber base composition from the first mixer into the second mixer. A further advantage of this embodiment is that a simple and reliable removal of the reaction products of the silicic acid/silane reaction is possible from the open ramless mixer, so that a high quality rubber base composition is produced.

The rotors of the second mixer can be tangent to each other. In still another embodiment of the invention, the rotors of the second mixer, however, mutually engage. The advantage of this embodiment is that an interengaging mixer has an excellent ratio of the surfaces of the rotors to the fill volume of the mixer and thereby it is ensured that, within a relatively short time, the total composition runs through between the rotors of the second mixer and, as a consequence, a thorough mixing of the silicic acid with the silane results.

According to another embodiment of the invention, the second mixer has a greater fill volume than the first mixer. Preferably, the fill volume of the second mixer is greater than the fill volume of the first mixer by 20 to 60%. Use is made of this embodiment when the first mixer is a ram mixer and the second mixer is a ramless mixer. The advantage of this embodiment becomes understandable when the following is considered. In a ram mixer, the composition is pressed continuously by the ram between the rotors of the mixer so that an excellent through mixing of the composition is ensured. In contrast, in a ramless mixer, the problem is present that the composition leaves the region between the rotors because of the rotation thereof and, because of the non-present ram, cannot again come into this region. A thorough mixing of the composition is then no longer ensured. This problem is that much greater the smaller the fill volume is of the mixer. The advantage of the embodiment is therefore that, because of the greater fill volume of the second mixer, virtually the entire composition can be accommodated in the region between the rotors and is almost always disposed in this region so that an excellent through mixing of the rubber base composition in the second mixer is ensured even without the ram.

According to still another feature of the invention, a suction device is mounted between the mixers with which reaction products can be drawn off by suction. These reaction products arise during the reaction of the silicic acid with the silane in the second mixer. The advantage of this embodiment is that a rapid and complete removal of the reaction products is ensured whereby the mixing times in the second mixer are shortened and the quality of the rubber base composition is again increased.

According to another embodiment of the invention, the transfer of the composition from the first mixer into the second mixer takes place by utilizing the force of gravity. In this case, the first mixer is preferably mounted directly above the second mixer. An advantage of this embodiment is that no ancillary means (for example, in the form of a conveyor belt, et cetera) is needed. A further advantage of this embodiment is that the two mixers are arranged relative to each other so that space is saved.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
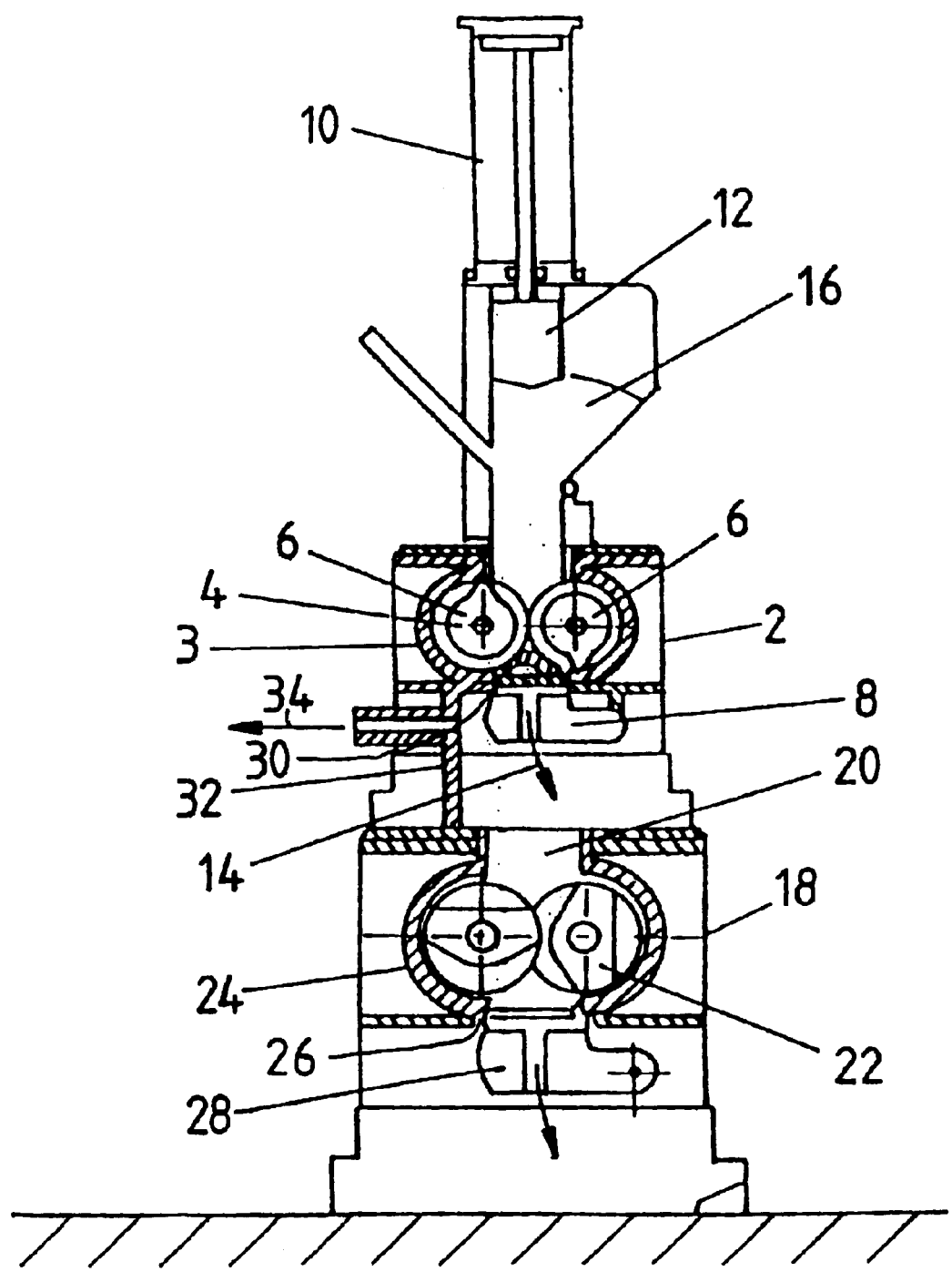
FIG. 1 is a schematic, in elevation, of an apparatus with which the method of the invention for producing a silicic-acid containing rubber base composition can be carried out.

FIG. 1 shows a schematic of an arrangement for producing a silicic-acid containing rubber base composition. The arrangement includes a first mixer 2 having a mixing chamber 4 in which two rotors 6 are disposed. These rotors are preferably interengaging rotors. The mixer 2 furthermore includes a saddle 8, which can be flipped downwardly, and a ram 12 for closing the inlet opening of the mixing chamber 4. The ram 12 is movable by a work cylinder 10. The saddle 8 can be flipped from the closed position shown in FIG. 1 to the open position in the direction of arrow 14 in which the saddle assumes an approximately perpendicular position. In this position, the saddle 8 clears the outlet opening 30 of the mixing chamber 4. The inlet openings, that is, the funnel 60 for the composition ingredients of the rubber base composition are disposed in the region of the ram 12.

A ramless second mixer 18 is mounted below the first mixer 2. The second mixer 18 has a mixing chamber 24 having a fill volume greater than by preferably 20 to 60% than the mixing chamber 4 of the first mixer 2. The second mixer 18 includes an inlet opening 20 and rotors 22 which are preferably interengaging rotors and are disposed in the mixing chamber 24. The outlet opening 26 of the second mixer 18 is closed by a movable saddle 28 which, in a manner known per se, can be flipped about a horizontal axis from the closed position shown in FIG. 1 into an open position. In the open position, the saddle clears the outlet opening 26 of the mixture chamber 24.

The second mixer 18 is mounted below the first mixer 2 so that the outlet opening 30 of the first mixer 2 is disposed above the inlet opening 20 of the second mixer 18. This arrangement makes it possible that a composition can be transferred from the mixing chamber 4 of the first mixer 2 into the mixing chamber 24 of the second mixer 18 exclusively by utilizing the force of gravity. Preferably, the outlet opening 30 of the first mixer 2 is connected via a channel 32 to the inlet opening 20 of the second mixer 18 to which a suction unit 34 is connected (indicated schematically by the arrow 34).

In the arrangement shown, a rubber base composition is produced as described below.

First, all composition ingredients are introduced via the funnel 16 into the mixture chamber 4 of the first mixer 2 simultaneously or in time spaced relationship. Accordingly, rubber, silicic acid, silane and other usual additives except for the vulcanization ingredients are introduced. With the aid of the rotor 6, the composition ingredients are thoroughly mixed. The composition ingredients are pressed between the rotors 6 by the ram 12 whereby a good dispersion of the composition ingredients is ensured. During mixing of the composition in the first mixer 2, the temperature of the composition is continuously increased, which takes place with a corresponding adaptation of the ram pressure of the ram 12, the rpm of the rotors 6 and the adjustment of the temperature of the mixer.

When a good dispersion of the composition ingredients is reached, the temperature of the composition in the first mixer 2 is brought to a value which lies in the temperature range in which the silicic acid reacts with the silane (that is, to a temperature which lies in the temperature range of 130° to 180° C.). The raising of the temperature takes place, in turn, by an adaptation of the ram pressure of the ram 12, the rpm of the rotors 6 and the temperature of the mixer.

When the composition has reached the desired temperature in the above-mentioned temperature range, then at this temperature, a first part of the reaction of the silicic acid with the silane is carried out in the first mixer 2. As soon as the desired temperature is reached or as soon as a first part of the reaction is carried out, the saddle 8 of the first mixer 2 is transferred from the closed position shown in FIG. 1 into the open position so that the saddle clears the outlet opening 30 of the first mixer 2. The composition is then exclusively transferred from the mixing chamber 4 through the channel 32 and through the inlet opening 20 into the mixing chamber 24 of the second mixer 18 without intermediate storage utilizing exclusively the force of gravity so that the composition temperature is maintained. In the second mixer 18, the composition is mixed to the end and the temperature of the composition is preferably held constant in the temperature range of 130° C. to 180° C., wherein the silicic acid reacts with the silane in an accelerated manner. This takes place via a corresponding matching of the rpm of the rotors 22 and the adjustment of the temperature of the mixer.

The composition remains in the mixing chamber 24 of the second mixer 18 until at least an almost complete reaction of the silicic acid with the silane is ensured, that is, the rubber base composition is mixed almost to the end. The reaction products, which arise in the reaction of the silicic acid with the silane, are drawn off via the channel 32 with the aid of the suction unit 34 during mixing so that no reaction products, which can reduce quality, remain in the composition. After the completed reaction, namely, when the rubber base composition is mixed to the end, the saddle 28 is transferred from the closed position, which is shown in FIG. 1, into the open position so that the rubber base composition is removed from the mixing chamber 24 of the second mixer 18 through the outlet opening 26. In additional processing stations (not shown), the rubber base composition is further processed and, in the last processing station, vulcanization ingredients are added to the rubber base composition and the rubber base composition is there mixed to the end in a final mixing process.

After the composition leaves the mixing chamber 4 of the first mixer 2 via the outlet opening 30, the first mixer 2 is again ready for the mixing of a rubber base composition so that always, at the same time, mixing can take place in the first mixer 2 and in the second mixer 18.

Figure 2:
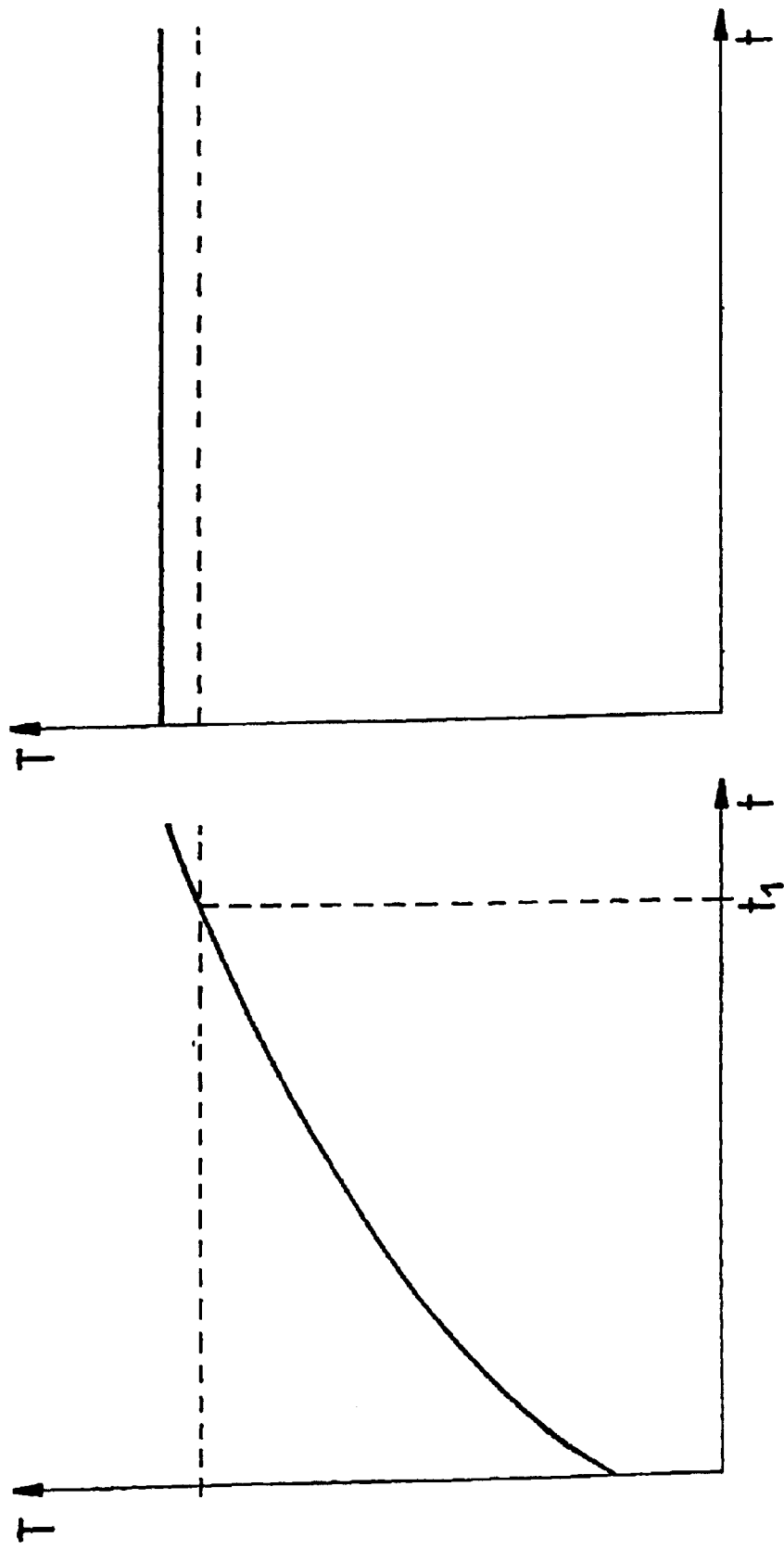
FIG. 2 shows two diagrams showing the temperature T in the mixers plotted as a function of time t; and, FIG. 3 shows two diagrams of temperature T in the mixers plodded as a function of time t.

FIG. 2 shows diagrams wherein the temperature T in the mixers (2, 18) is plotted as a function of time t. Here, a mixing forms the basis in which the dispersion of the composition ingredients takes approximately the same time as the complete reaction of the silicic acid with the silane. The left part of the diagram shows the time-dependent temperature trace for the composition in the first mixer 2. This diagram shows that the temperature of the composition ingredients is increased continuously starting from room temperature in the first mixer 2 whereby the composition ingredients disperse. After a time span $t_1$, the composition in the first mixer reaches a temperature of 130° C. whereat the silicic acid in the composition begins to intensively react with the silane. The temperature of the composition is thereafter only raised slightly in the first mixer 2 so that the temperature lies in a temperature range of 130° C. to 180° C.

When the temperature of the composition in the first mixer 2 has reached the desired temperature in the above-mentioned temperature range, the composition is transferred from the first mixer 2 into the second mixer 18 and is there mixed to completion at this temperature which is held constant and (see the right part of the diagram, which shows the time-dependent trace of the composition in the second mixer 18). The dwell times of the composition in the mixers (2, 18) are almost identical because the dispersion takes place almost exclusively in the first mixer 2 and the reaction of the silicic acid with the silane takes place in the second mixer 18.

FIG. 3 shows a diagram wherein the temperature T in the mixers (2, 18) is plotted as a function of time t. Here, a composition forms the basis wherein the uniform distribution of the composition ingredients takes a first time span $t_1$ and the almost complete reaction of the silicic acid with the silane takes a second time span $t_2$, which is longer than the first time span $t_1$. In this case too, it is possible to match the dwell times of the composition in the mixers (2, 18) in such a manner with respect to each other that they are identical as is explained hereinafter (here, the left part of the diagram shows the time-dependent temperature trace for the composition in the first mixer 2 and the right part of the diagram shows the time-dependent temperature trace for the composition in the second mixer 18). In the first mixer 2, the composition ingredients are introduced at the same time or at time intervals and dispersed over the time span $t_1$. Here, the temperature of the composition ingredients is increased starting from room temperature to a temperature of approximately 130° C. At this temperature, the silicic acid starts to react intensively with the silane. After the first time span $t_1$ has elapsed, the temperature of the composition is increased to a desired temperature in the temperature range of 130° C. to 180° C. In total, the temperature of the composition is held in the first mixer 2 over a time span $t_3=(t_2-t_1)/2$ in the temperature range of 130° C. to 180° C. The dwell duration of the composition in the first mixer 2 amounts to a total $(t_1+t_2)/2$.

After the elapse of time span $t_3$, the composition is transferred directly from the first mixer 2 into the second mixer 18 without intermediate storage. In the second mixer 18, the temperature of the composition lies in the temperature range of 130° C. to 180° C. over the entire dwell duration $(t_1+t_2)/2$ of the composition in the second mixer; that is, the dwell duration of the composition in the second mixer 18 corresponds to the dwell duration of the composition in the first mixer 2. Preferably, the temperature of the composition in the second mixer is held constant at the value which the composition had assumed in the transfer from the first mixer into the second mixer 18.

From the above, it follows that the temperature of the composition is in a temperature range of 130° C. to 180° C. over a time span $t_3+(t_1+t_2)/2=t_2$ (as desired).

The dwell times of the composition in the mixers (2, 18) are identical so that an optimal utilization of the capacity of the mixers is assured.

EXAMPLE

A first time span $t_1$ is needed in order to uniformly distribute the composition ingredients: 2 minutes;

a second time span $t_2$, which is needed to bring about an almost complete reaction of the silicic acid with the silane in the composition: 4 minutes;

total time which is made up of the sum of the first time span $t_1$ and the second time span $t_2$: 6 minutes;

dwell time of the composition in the first mixer: 3 minutes $((t_1+t_2)/2)$.

Here, the time span $t_3$, in which the temperature lies in a temperature range of 130° C. to 180° C.: 1 minute $((t_2-t_1)/2)$.

Dwell time of the composition in the second mixer where the temperature of the composition lies in a temperature range of 130° C. to 180° C.: 3 minutes $((t_1+t_2)/2)$.

It is understood that the foregoing description is that of the preferred embodiments of the invention and that various changes and modifications may be made thereto without departing from the spirit and scope of the invention as defined in the appended claims.

What is claimed is:

1. A method for making a silicic acid containing rubber base composition, the method comprising the steps of:
   providing composition ingredients of rubber, silicic acid, silane and additional additives except for vulcanization ingredients;
   providing first and second mixers separate from each other wherein said ingredients except for said vulcanization ingredients can be mixed;
   introducing all of said composition ingredients into said first mixer except for said vulcanization ingredients simultaneously or at time intervals;
   mixing said composition ingredients introduced into said first mixer to a composition in said first mixer;
   transferring the composition formed in said first mixer directly into said second mixer without an intermediate storage thereof; and,
   mixing the transferred composition formed in said first mixer at least almost to completion in said second mixer with the temperature lying in the temperature range of 130° C. to 180° C. at least over the greatest part of the dwell time of the composition in said second mixer wherein said silicic acid reacts acceleratedly with said silane.

2. The method of claim 1, comprising the further step of heating said composition in said first mixer to a temperature lying in a temperature range of 110° C. to 140° C.

3. The method of claim 1, comprising the further step of heating said composition in said first mixer to a temperature lying in a temperature range of 130° C. to 180° C.

4. The method of claim 1, wherein the dwell time of the composition in said first mixer corresponds to the dwell time of the composition in said second mixer.

5. The method of claim 4, wherein:
   a first time duration is needed in order to uniformly distribute said composition ingredients;
   a second time duration longer than said first time duration is needed in order to bring about at least almost a complete reaction of said silicic acid with said silane;
   said dwell time in said first mixer and said dwell time in said second mixer corresponds to half of the total time composed of said first and second time durations; and,
   the temperature of said composition in said first mixer is held in a temperature range of 130° C. to 180° C. over at least a time span which amounts to the difference between said second time duration and the dwell time of the composition in said second mixer.

6. The method of claim 1, wherein said first mixer is a ram mixer.

7. The method of claim 6, wherein the rotors of said first mixer interengage.

8. The method of claim 1, wherein said second mixer is a ramless mixer.

9. The method of claim 8, wherein the rotors of said second mixer interengage.

10. The method of claim 1, wherein said second mixer has a greater fill volume than said first mixer.

11. The method of claim 1, comprising the further step of providing a suction unit between said first and second mixers for drawing off reaction products which develop during the reaction of said silicic acid and said silane in said second mixer.

12. The method of claim 1, wherein the transfer of the composition from said first mixer to said second mixer takes place utilizing gravity force.

* * * * *